(No Model.) 3 Sheets—Sheet 3.
J. L. STEWART.
INCANDESCENT GAS LAMP OR BURNER.
No. 416,514. Patented Dec. 3, 1889.
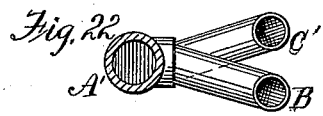
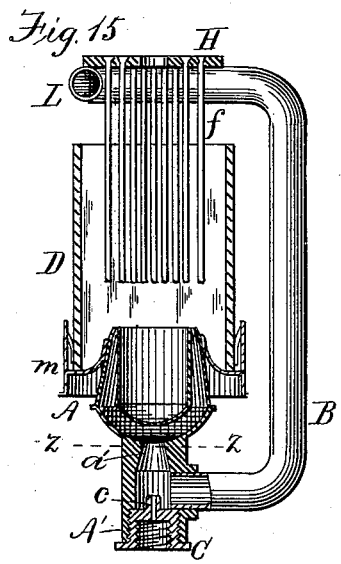
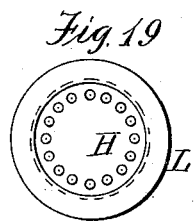
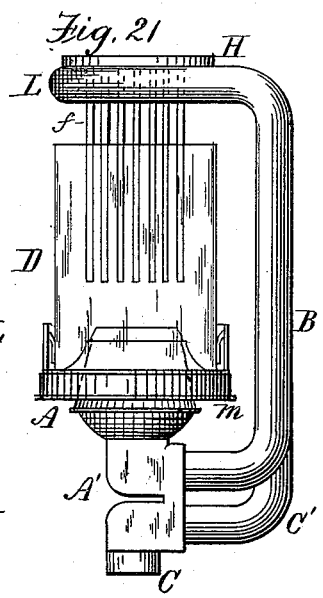
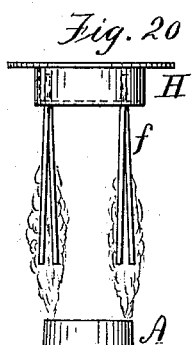
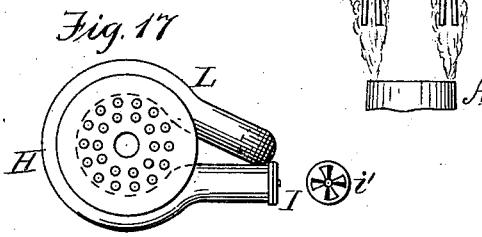
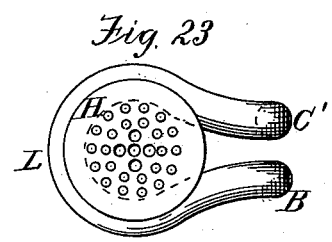
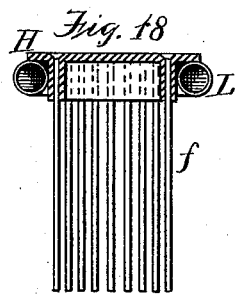
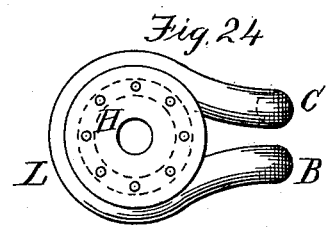
Witnesses;
A. L. Stewart
I. B. Dubers
Inventor
John L. Stewart.

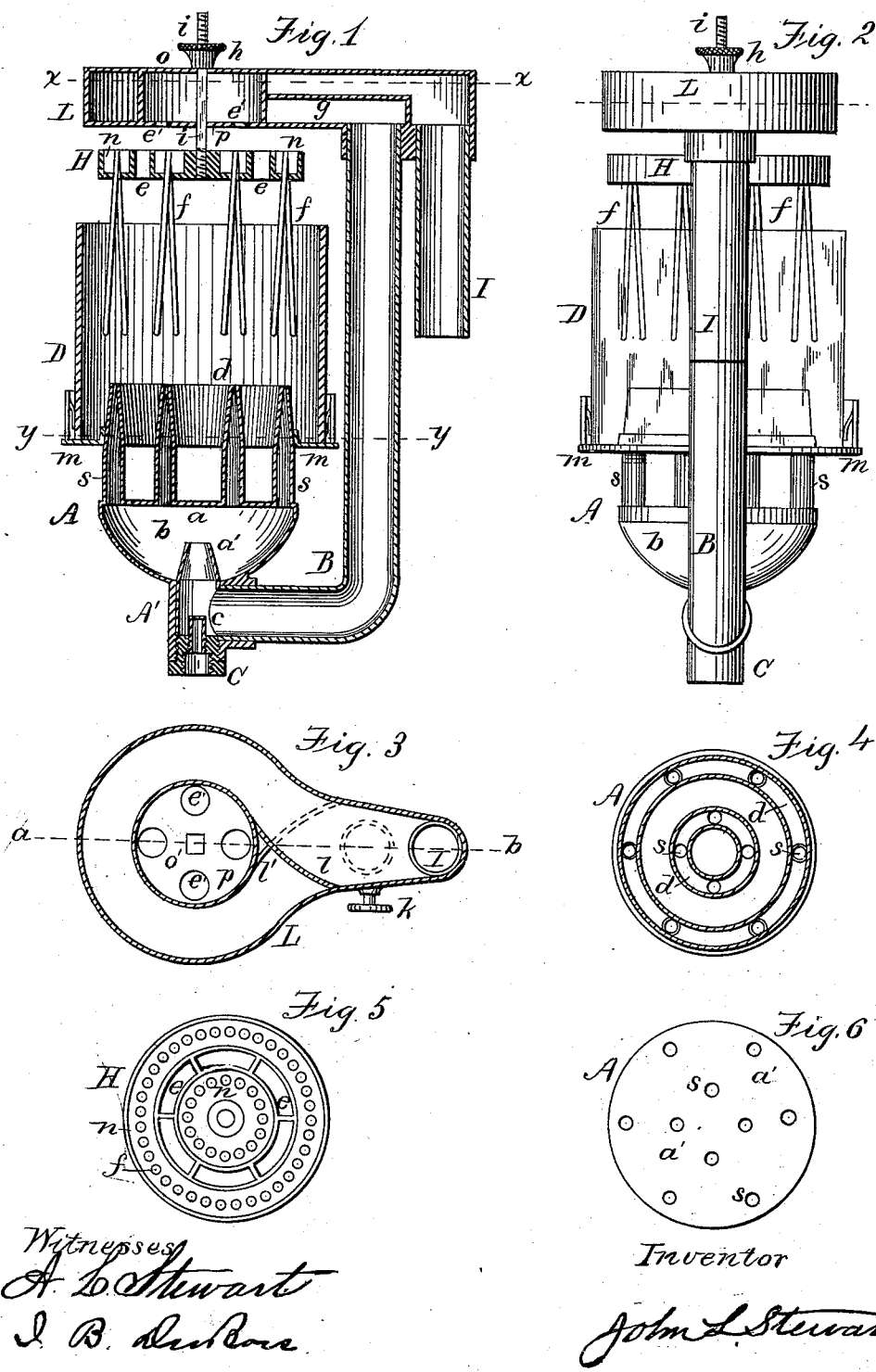

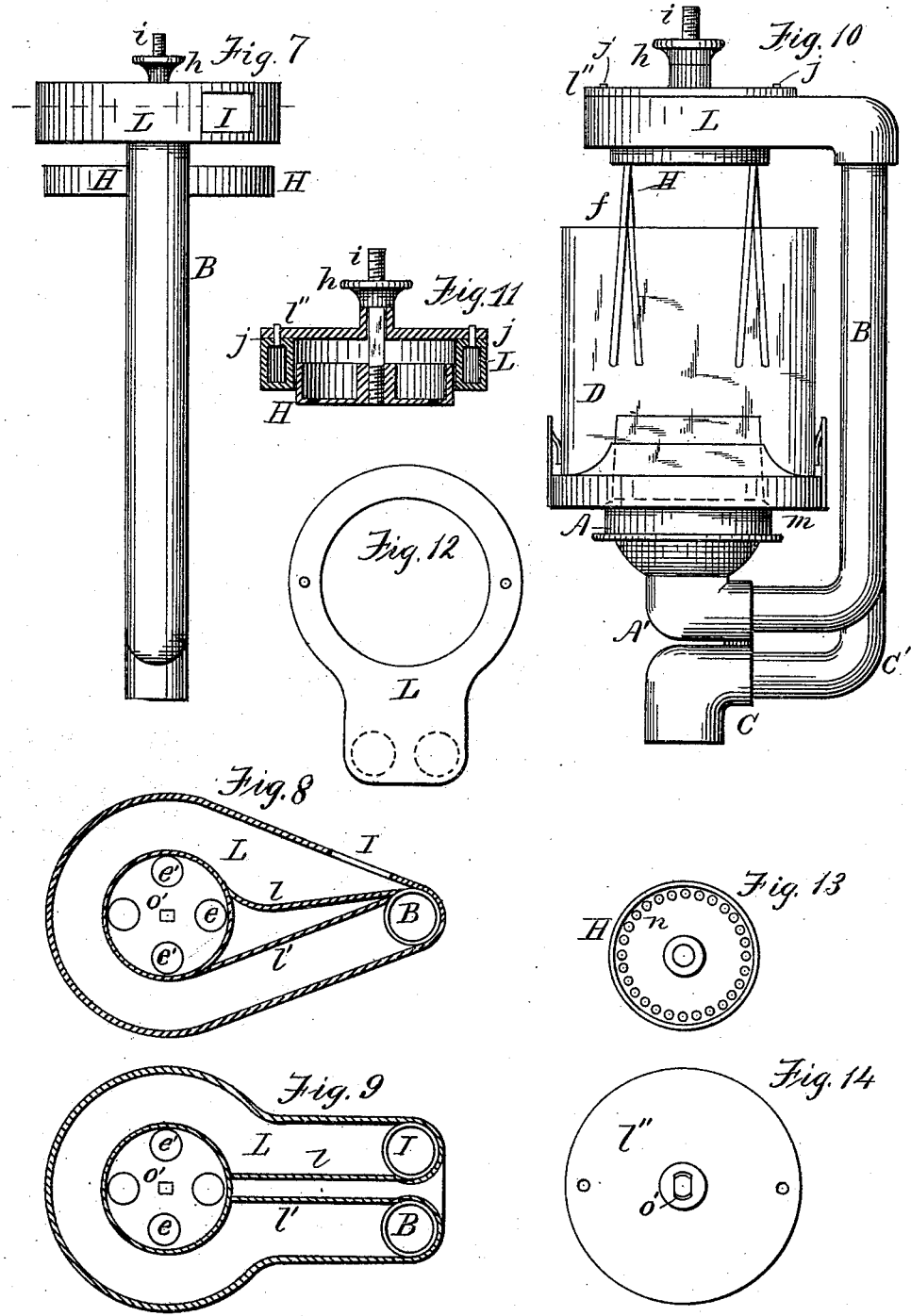

UNITED STATES PATENT OFFICE.

JOHN L. STEWART, OF PHILADELPHIA, PENNSYLVANIA, ASSIGNOR, BY MESNE ASSIGNMENTS, TO THE WELSBACH INCANDESCENT GAS LIGHT COMPANY, OF GLOUCESTER, NEW JERSEY.

INCANDESCENT GAS LAMP OR BURNER.

SPECIFICATION forming part of Letters Patent No. 416,514, dated December 3, 1889.

Application filed December 6, 1887. Serial No. 257,126. (No model.)

*To all whom it may concern:*

Be it known that I, JOHN L. STEWART, a citizen of the United States, and a resident of Philadelphia, in the county of Philadelphia and State of Pennsylvania, have invented new and useful Improvements in Incandescent Gas Lamps or Burners, of which the following is a specification.

This invention relates to gas-burners and their immediate connections, constituting what may be styled "incandescent gas-lamps," in which brilliant illumination is produced by the combustion of gas alone, or a mixture of gas and air, in contact with readily-incandescing bodies, or, more particularly, slender cylinders, rods, needles, or filaments or tubes of refractory compounds especially adapted for becoming incandescent in a non-luminous flame.

The objects of the invention are to provide means for conveniently and economically heating the gas or air flowing to the burner and for using one of such fluids under pressure to draw or force the other through the heating attachment of the incandescent lamp; also, to provide suitable means for supporting the incandescing rods or tubes in a favorable position in the gas-flame and adjust them and their holding-frame with relation to the burner-tips for securing the best results, and also to so set the rods, tubes, or filaments of incandescing material in the frames as to obtain the best effect of the flame in producing incandescence, and thereby secure the best possible illumination or light with a given consumption of gas.

The construction and operation of my incandescing burners or lamps will be particularly described with reference to the accompanying drawings, and the features constituting my invention will be defined in the claims.

In the drawings, Figure 1 represents a vertical longitudinal section on line *a b* of Fig. 3 of a double Argand burner, air-heater, and incandescent needle or rod-holder constituting my incandescent gas-lamp. Fig. 2 is a rear elevation thereof. Fig. 3 is a horizontal section on line $xx$ of Fig. 1. Fig. 4 is a horizontal section through burner on line $y y$, Fig. 1. Fig. 5 is a plan view of the needle or rod-holding frame. Fig. 6 is a top plan view of mixing-chamber of burner. Fig. 7 is a rear elevation, and Fig. 8 is a horizontal section, of a modified form of the air-heater. Fig. 9 is a horizontal section of an air-heater, showing a slight modification of the form shown in Fig. 3. Fig. 10 is a side elevation, and Fig. 11 is a cross-section, of the device, showing a gas-heater and needle or rod-holder in modified form. Fig. 12 is a plan view of the heater. Fig. 13 is a top view of needle-holder, and Fig. 14 is a plan view of top plate of heater. Fig. 15 is a vertical section of the device with air-heater, and Figs. 16, 17, 18, 19, and 20 are detail views of parts thereof. Fig. 21 is an elevation showing a gas-heater, and Figs. 22, 23, and 24 are detail views of parts thereof.

In carrying out my invention I heat the air and force it to the burner by the pressure of a jet of gas; or I heat the gas and by means of an injector-nozzle draw in cool air to mingle with the hot gas and supply the mixture to the burner; or the gas and air may both be heated before entering the burner; or the gas alone is heated and supplied, without admixture of air therewith, direct to the burner.

In this application a single or double Argand burner is used, and in the drawings A designates the body of such a burner provided, as shown in Figs. 1 and 2, with two burner-rings or annular nozzles *d*, which are supported upon the top plate *a* of the mixing-chamber *b* by tubes *s*, such tubes serving to conduct the mixture of gas and hot air from chamber *b* to the ring-burners. A tubular T-shaped union-socket A' projects at the base of chamber *b*, and in this socket is fitted or formed the outer and larger nozzle *a'* of the injector, and with such nozzle the air-supply pipe B connects. The gas-supply pipe C, having a jet-nipple *c*, is screwed or otherwise secured in the lower end of the socket, and the jet-nipple projects up into outer nozzle a sufficient distance to best induce a current of air through the heater and force it to the burner. The air-pipe B is fitted at its lower end into the horizontal branch of the union-socket, and is connected at its upper end with the heater L. The heating-chamber L may be cast of brass or other suitable metal, and is formed with two vertical partitions $l\,l'$ and a horizontal partition $g$, dividing its inlet from its outlet chamber on the side where the inlet and outlet pipes connect, as shown in Figs. 1 and 3. The body of the heater is annular in form, as shown in Fig. 3, and within such body a central space is left for the circulation of hot products from the burner-flame. A top plate $o$ and bottom plate $p$ inclose the central space, and such plates are provided with smoke-holes $e'$. The bottom plate $p$ is provided with a central square opening $o'$ for the passage through it of the connecting-rod $i$, which is also made square, so that it will not turn in its bearings when it is raised or lowered by nut $h$, applied to its screw-threaded upper end. The non-rotatable rod $i$ may be provided with a feather or rib and passed through a notched opening in plate $p$, in lieu of the form shown.

The air-inlet tube I connects with the heater immediately behind tube B, and is only about one-third the length of tube B. It may be made shorter or dispensed with altogether, as shown in Figs. 7, 8, and 17.

In Figs. 7 and 8 the air-inlet opening I is made in the side of the annular heater.

In Fig. 17 the end of the bent tube forming the heater is provided with a damper or register $i'$ for controlling the inflow of air.

In Fig. 9 the air-inlet tube I is placed by the side of tube B, and the form of chamber L slightly modified, as shown.

In Figs. 10, 11, 12, 21, 22, 23, and 24 I have shown the heater and connecting-pipes arranged and adapted for heating gas on its passage to the burner. The union socket A' is modified in form, the injector being omitted, and pipe C' connects the inlet-chamber of the socket to the gas-heater L, and pipe B connects the heater with the outlet-chamber of the socket which leads into the burner. This arrangement of heater and connecting-pipes is adapted for the use of fuel-gas, such as water-gas, which may be advantageously heated for increasing the heat of the flame resulting from its combustion. When gas alone is heated, the annular heating-chamber and connecting-pipes may be only of about one-quarter the capacity of those used for air, and the annular heater L is therefore formed with a central opening sufficiently large to receive the adjustable needle cup or holder H, as shown in Figs. 10, 11, and 12. This makes a neater and more compact arrangement of parts.

The heater L is cast and is provided with a top plate $l''$, which is held in place by two pins $j$, secured in the heater, so that by taking hold of the thumb screw or nut $h$ the needle-cup, needles, and top plate can all be lifted off together and replaced in the same manner.

In Figs. 21, 23, and 24 the heater is formed simply of the gas-pipe bent into annular form, and the needle-cup rests, by means of a flange, upon the top of the heater.

The needle holders or cups H (shown in Figs. 1, 2, 5, 10, 11, 13, and 20) are preferably formed of thin metal spun into form. The upper ends of the needles or rods $f$ project up into the cup, so as to be flush with its top edges, and by means of a former or setting device are arranged in inclined positions, and preferably the adjacent needles, in a row or ring, are inclined in opposite directions, as shown, whereby the flame is caused to impinge upon and hug their surfaces with better effect, and thus heat them to a higher degree with a given consumption of gas. The needles having been set in the desired positions in the cup, the latter is filled with cement or a plastic compound that will set and stand the action of heat.

The arrangement of the needles in slanting and diverging positions is an important feature of my invention, as thereby the flame hugs the needles all the way up and makes a greater portion of their surfaces incandescent, and thus yield more light than would result from a perpendicular position of the needles.

In the needle-holders shown in Figs. 15, 17, and 18 the holes for needles are made flaring in the upper side of the disk, and the needles are provided with heads fitting in the flaring portion of the holes. The suspending-rod $i$ is screwed into the central hub of the needle-cup, and above such hub it is flattened or made square where it passes through the top plate of the heater, as shown in Figs. 3, 11, and 14, so that it will not turn when the thumb-nut $h$ is turned on its upper screw-threaded end for raising or lowering the needle-cup to properly adjust it with relation to the flame. Either a single or a double Argand burner is used, and the needles are arranged in either single or double rings over each annular burner. The chimney-holder $m$ is secured in the usual manner upon the burner, and upon such holder I support a short glass chimney D, suitable for protecting the flame from air-currents.

The parts being placed in proper relation to each other, as shown and described, the gas may be turned on and ignited at the burner, when the needles, rods, or tubes almost immediately become incandescent and give a beautiful soft steady light. When coal-gas or a gas containing carbureted hydrogen or hydrocarbon compounds is used, a current of hot air is preferably supplied with the gas to the burner, so that a blue flame without free carbon is produced, as it is desirable to avoid the deposit of carbon upon the incandescing needles or rods.

It is noted that the air-heating devices may be connected to and used with other forms of burners than the Argand, if desired, and I do not confine myself to Argand burners in such connection.

Having described my invention, what I claim, and desire to secure by Letters Patent, is—

1. In an incandescent gas-lamp, the combination of the annular gas-burner, the air-heater supported above the burner and connected therewith, and the holder suspended from the heater for supplying incandescing bodies above the burner, substantially as shown and described.

2. In an incandescent gas-lamp, the combination of the annular gas-burner, the air-heater supported above the burner and connected therewith, and the holder adjustably suspended from the heater for supporting incandescing bodies above the burner, substantially as described.

3. In an incandescent gas-lamp, the combination of the annular gas-burner, the air-injector nozzle, the air-heater supported above the burner, the pipe connecting said heater with the air-injector nozzle, the gas-supply pipe having a nipple projecting into said nozzle, and incandescing bodies suspended above the burner, substantially as described.

4. In an incandescent gas-lamp, the combination of a gas-burner, an annular air-heater supported above said burner and provided with passages through its central portion, a pipe connecting said heater with the burner, and a holder suspended from the heater for supporting incandescing bodies above the burner, said holder being provided with openings for the passage of hot products from the burner, substantially as described.

5. In an incandescent gas-lamp, the combination of a gas-burner, an air-heater supported above and connected with said burner, the cup or holder H, the non-rotatable suspending-rod $i$, and a nut located on the screw-threaded upper end of said rod for adjustably supporting said holder, substantially as described.

In testimony that I claim the foregoing as my invention I have signed my name, in presence of two witnesses, this 29th day of September, 1887.

JOHN L. STEWART.

Witnesses:
CHAS. MATHEWS, Jr.,
ELLA C. NEWBOLD.